(12) United States Patent
Kesavan et al.

(10) Patent No.: US 11,722,456 B2
(45) Date of Patent: Aug. 8, 2023

(54) COMMUNICATIONS IN INTERNET-OF-THINGS DEVICES

(71) Applicant: Intel Corporation, Santa Clara, CA (US)

(72) Inventors: Vijay Sarathi Kesavan, Portland, OR (US); Sudarshan Prasad, Hillsboro, OR (US); Carlos Cordeiro, Portland, OR (US); Bahareh Sadeghi, Portland, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/307,393

(22) PCT Filed: Jul. 1, 2016

(86) PCT No.: PCT/US2016/040799
§ 371 (c)(1),
(2) Date: Dec. 5, 2018

(87) PCT Pub. No.: WO2018/004677
PCT Pub. Date: Jan. 4, 2018

(65) Prior Publication Data
US 2019/0260707 A1    Aug. 22, 2019

(51) Int. Cl.
*H04L 67/12* (2022.01)
*H04L 67/51* (2022.01)
(Continued)

(52) U.S. Cl.
CPC .......... *H04L 61/4541* (2022.05); *H04L 61/00* (2013.01); *H04L 61/4535* (2022.05);
(Continued)

(58) Field of Classification Search
CPC ..... H04L 61/1541; H04L 29/12; H04L 29/08; H04L 61/1535; H04L 61/20;
(Continued)

(56) References Cited

U.S. PATENT DOCUMENTS 6,834,294 B1 * 12/2004 Katz ..................... G06F 3/0219
341/23
8,799,262 B2 * 8/2014 Paduroiu ............ G06Q 30/0201
707/709
(Continued)

FOREIGN PATENT DOCUMENTS

DE    112016006813    1/2019
JP    2007304652 A  * 11/2007
(Continued)

OTHER PUBLICATIONS

International Search Report for Related PCT Application PCT/US2016/040799 filed Jul. 1, 2016 dated Mar. 30, 2017, 3 pages.
(Continued)

*Primary Examiner* — Lesa M Kennedy
(74) *Attorney, Agent, or Firm* — Schwegman Lundberg & Woessner, P.A.

(57) ABSTRACT

A method and apparatus for communications in internet-of-things devices are provided. An exemplary apparatus includes an IoT server device. The IoT server device includes a communications device and a resource name map including a full identifier string and a short identifier string. A discovery responder provides the full identifier string and a short identifier string to a client device through the communications device.

33 Claims, 12 Drawing Sheets

(51) Int. Cl.

| | | |
|---|---|---|
| H04L 101/604 | (2022.01) | |
| H04L 61/4541 | (2022.01) | |
| H04L 67/025 | (2022.01) | |
| H04L 69/325 | (2022.01) | |
| H04W 4/70 | (2018.01) | |
| H04L 61/00 | (2022.01) | |
| H04L 61/50 | (2022.01) | |
| H04L 61/4535 | (2022.01) | |
| H04L 65/40 | (2022.01) | |

(52) U.S. Cl.
CPC .............. *H04L 61/50* (2022.05); *H04L 65/40* (2013.01); *H04L 67/025* (2013.01); *H04L 67/12* (2013.01); *H04L 67/51* (2022.05); *H04L 69/325* (2013.01); *H04W 4/70* (2018.02); *H04L 2101/604* (2022.05)

(58) Field of Classification Search
CPC ... H04L 61/6004; H04L 67/025; H04L 67/12; H04L 67/16; H04L 69/325; H04L 61/4541; H04L 67/51; H04L 65/40; H04L 61/00; H04L 2101/604; H04W 4/70
USPC ........................................................ 709/245
See application file for complete search history.

(56) References Cited

U.S. PATENT DOCUMENTS

| | | | | |
|---|---|---|---|---|
| 8,938,526 | B1* | 1/2015 | Richardson | H04L 67/1036 709/217 |
| 9,326,122 | B2* | 4/2016 | Xiong | H04W 72/02 |
| 9,396,287 | B1* | 7/2016 | Bhave | H04L 69/329 |
| 9,524,343 | B2* | 12/2016 | Liu | G06F 16/951 |
| 2001/0039587 | A1* | 11/2001 | Uhler | H04L 61/35 709/229 |
| 2004/0248558 | A1* | 12/2004 | Chandhok | H04L 61/30 455/414.1 |
| 2007/0136279 | A1* | 6/2007 | Zhou | G06F 16/9566 707/E17.115 |
| 2008/0301116 | A1* | 12/2008 | Wang | G06F 16/951 707/999.005 |
| 2009/0248893 | A1* | 10/2009 | Richardson | H04L 67/327 709/239 |
| 2011/0035437 | A1* | 2/2011 | Toumura | H04L 29/12066 709/203 |
| 2012/0059869 | A1 | 3/2012 | Seo et al. | |
| 2012/0102087 | A1* | 4/2012 | Chor | H04L 67/02 709/202 |
| 2012/0137210 | A1* | 5/2012 | Dillon | G06F 16/9574 715/234 |
| 2012/0214443 | A1* | 8/2012 | Daigle | G06Q 20/401 455/411 |
| 2013/0086245 | A1* | 4/2013 | Lu | H04L 12/66 709/250 |
| 2013/0226863 | A1* | 8/2013 | Jonker | H04L 43/028 707/723 |
| 2013/0227662 | A1* | 8/2013 | Crampton | G06F 16/955 726/6 |
| 2014/0056172 | A1* | 2/2014 | Lee | H04W 76/10 370/254 |
| 2014/0056220 | A1* | 2/2014 | Poitau | H04W 40/246 370/328 |
| 2014/0115721 | A1* | 4/2014 | Shan | H04L 63/083 726/27 |
| 2014/0192660 | A1* | 7/2014 | Garner | H04W 72/04 370/252 |
| 2014/0241354 | A1* | 8/2014 | Shuman | H04L 65/102 370/390 |
| 2014/0244568 | A1* | 8/2014 | Goel | H04L 67/12 706/46 |
| 2014/0244833 | A1* | 8/2014 | Sharma | H04L 67/12 709/224 |
| 2014/0330929 | A1* | 11/2014 | Dong | G16H 40/67 709/217 |
| 2014/0369251 | A1* | 12/2014 | Zhang | H04W 4/08 370/312 |
| 2015/0006296 | A1* | 1/2015 | Gupta | G06Q 30/0269 705/14.66 |
| 2015/0006719 | A1* | 1/2015 | Gupta | H04L 67/12 709/224 |
| 2015/0012551 | A1* | 1/2015 | Dong | G06F 16/245 707/755 |
| 2015/0055557 | A1* | 2/2015 | Dong | H04L 67/2842 370/328 |
| 2015/0067154 | A1* | 3/2015 | Ly | H04W 4/38 709/224 |
| 2015/0156266 | A1 | 6/2015 | Gupta | |
| 2015/0161282 | A1* | 6/2015 | Low | H04L 67/306 709/203 |
| 2015/0227618 | A1* | 8/2015 | Dong | H04L 61/15 707/736 |
| 2015/0373813 | A1* | 12/2015 | Nieuwlands | H05B 47/175 315/294 |
| 2015/0382436 | A1* | 12/2015 | Kelly | G08C 17/02 315/131 |
| 2016/0057237 | A1* | 2/2016 | Yang | H04L 67/16 709/224 |
| 2016/0088049 | A1 | 3/2016 | Seed et al. | |
| 2016/0127312 | A1* | 5/2016 | Foti | H04L 67/12 709/223 |
| 2016/0134932 | A1* | 5/2016 | Karp | H04L 67/1097 348/207.11 |
| 2016/0164748 | A1* | 6/2016 | Kim | G06N 5/046 706/47 |
| 2016/0191295 | A1* | 6/2016 | Dong | G06F 16/2246 707/741 |
| 2016/0226732 | A1* | 8/2016 | Kim | H04W 12/0431 |
| 2017/0093861 | A1* | 3/2017 | Kesavan | H04L 41/0893 |
| 2017/0373855 | A1* | 12/2017 | Pritchard | H04L 9/0643 |
| 2017/0374154 | A1* | 12/2017 | Hamill | H04L 67/125 |
| 2018/0176745 | A1* | 6/2018 | Yang | H04W 8/24 |
| 2018/0307773 | A1* | 10/2018 | Zhou | G06F 16/9562 |
| 2021/0152434 | A1* | 5/2021 | Chamarajnager | H04L 41/12 |

FOREIGN PATENT DOCUMENTS

| | | |
|---|---|---|
| WO | 2015-056952 A1 | 4/2015 |
| WO | 2018004677 | 1/2018 |

OTHER PUBLICATIONS

"International Application Serial No. PCT US2016 040799, Written Opinion dated Mar. 30, 2017", 9 pgs.

"International Application Serial No. PCT US2016 040799, International Preliminary Report on Patentability dated Oct. 31, 2019", 11 pgs.

* cited by examiner

100

300

600

800

COMMUNICATIONS IN INTERNET-OF-THINGS DEVICES

CROSS REFERENCE TO RELATED APPLICATIONS

Pursuant to 35 U.S.C. § 371, this application is the United States National Stage Application of International Patent Application No. PCT/US2016/040799, filed on Jul. 1, 2016, the contents of which are incorporated by reference as if set forth in their entirety herein.

TECHNICAL FIELD

The present techniques relate generally to Internet of Things (IoT) devices. More specifically the present techniques relate to improvements in efficiency of communications between IoT devices and between IoT devices and control systems.

BACKGROUND

It has been estimated that the Internet of Things (IoT) may bring connectivity to 50 billion devices by 2020. The IoT devices may be used for any number of applications, including home and office control applications, among others. The large numbers of these devices may make result in substantial amounts of traffic between IoT devices. This may strain communications infrastructure, especially in low bandwidth radio communications between IoT devices.

BRIEF DESCRIPTION OF THE DRAWINGS

FIG. 10 is a block diagram of a non-transitory, computer readable medium that includes instructions, which when executed, direct one or more processors to perform the functions of a client device.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
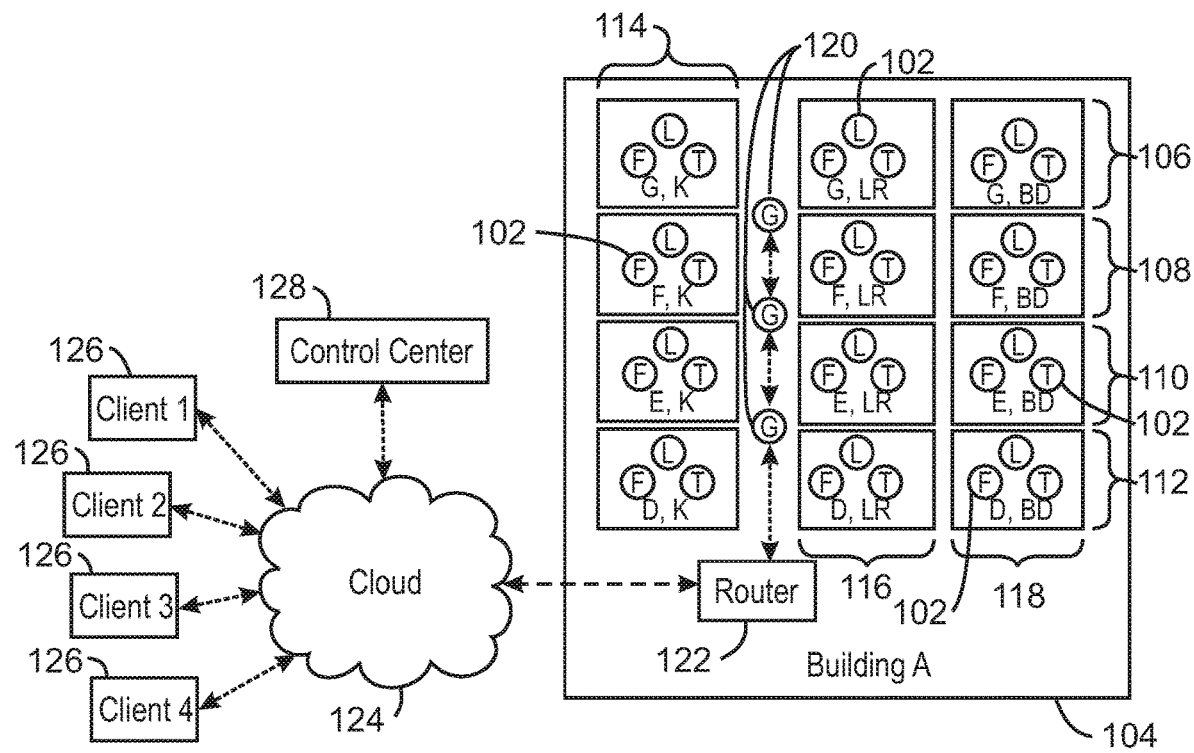
FIG. 1A is an example of an internet-of-things control scheme using an apartment building as a target.

The internet of things (IoT) is a concept in which a large number of computing devices are interconnected to each other and to the Internet to provide functionality and data acquisition at very low levels. For example, IoT networks may include home and commercial automation devices, such as lights, fans, thermostats, locks, cameras, alarms, motion sensors, water distribution systems, electric power distribution systems, pipeline control systems, plant control systems, and the like. These devices, termed IoT devices herein, may be accessible through portable client devices, remote computers, servers, and other systems, for example, to control systems or access data.

The Open Connectivity Foundation™ (OCF) is an organization that has defined a standard specification for IoT devices to be discovered and connected across multiple operating systems (OSs), platforms, and technologies. This specification, termed the Open Interconnect Consortium (OIC) standard specification 1.0, was released by the OCF on Dec. 23, 2015. In the OIC standard, things, such as lights, fans, and thermostats, among many other devices, are modeled as resources that exist on IoT server devices. This standard allows devices to discover each other and establish communications for interconnects. Other IoT standards and protocols like oneM2M, CoAP, and many others, may also use the resource model.

Each resource is identified by a URI (uniform resource identifier) which is unique to the device hosting the resource. The device hosting the resource is considered as a logical server, termed an IoT server device herein. Each resource may also have a set of properties that describe the resource and actions permissible on resource and are specified during the creation or instantiation of the resource. A resource type (RT) property provides information on the type of the resource, whereas an interface type (IF) property provides information on the type of interfaces the resource supports. Each IF property has a distinct set and pattern of operations that can be performed on resource. Attributes, or attribute values, of a resource represent the functional state of the resource and can change. The attributes of a resource can be accessed or changed using GET, PUT, POST, and DELETE methods, among others, on the resource URI. Operations used in the REST (representational state transfer) paradigm, such as GET, PUT, POST, and DELETE may be used to interact with the resource.

In the OIC standard, an IoT server device is a logical entity that exposes the hosted resources, which may be termed IoT resources, or resources, herein. A client, termed a client device herein, is a logical entity that accesses IoT resources on IoT server device. For example, a thermostat may be an IoT server device that has a sensor to measure temperature and actuator that controls the temperature. The sensor and actuator together can be exposed to other IoT devices as a thermostat resource. A client device that interacts with the thermostat resource to read, display, and set the temperature may be a smartphone application, a web interface, a house control system, an apartment complex control system, and the like. Interactions between the client and server uses a standard notion of the form <Scheme>://<Authority>/<Path>?<Query>. IoT server devices in OIC exist within a domain or URI authority and each resource has an identifier, referred to as "Path" above. The authority along with the Path uniquely identifies every resource. Resources are associated with attributes, listed as name: value pairs, that describe the functional state of the resource, such as temperature: 76° F., temperature setting: 74° F., air conditioning: on, and the like. Human readable URIs, used in combination with full names for properties to form full identifier strings, provide ease of management and ease of visualization. However, the full identifier strings may impose a significant burden on communications between devices, especially bi-directional radio communications, which may be bandwidth limited.

Methods and systems for efficient communications between IoT devices, IoT server devices, and client devices, are described herein. The communication uses a short identifier string including the URI authority, resource URIs, attributes, and properties, for efficient communications over constrained channels, such as radio communications. The techniques are transparent from the end applications, and retain the use of the resource model and RESTful paradigm, e.g., GET, PUT, etc., as described herein.

The short identifier string may be generated from the full identifier string, for example, using a hash code calculation, a lookup function, or other techniques. In other examples, it may be selected from a catalog of similar strings, or it may be a random string, for example, generated by a random number function using the full identifier string as a seed function. Any number of other techniques may be used to generate the short identifier string, such as a universal uniform resource identifier engine. The short identity string decreases the amount of information transmitted between devices while ensuring its uniqueness in the network and keep the shortening transparent from the application layer.

Further, the use of URI to access attributes and resources is not limited to physical devices. A resource may be a logical device with parameters that can be adjusted. For example, the resource may be a logical server used to access a physical device, and the attributes for the logical server may include a setting to start the use of a short identifier string or to stop the use of a short identifier string. Other attributes may concern logistics of devices, such as memory usage, communications, and the like.

FIG. 1A is an example 100 of an internet-of-things control scheme using an apartment building as a target. As described herein, the OIC standard adopts the resource model and uses methods like GET, PUT, POST, and DELETE as defined in a RESTful paradigm for interactions between IoT server devices 102 and client devices. In this example, a number of IoT server devices 102, such as fans (F), lights (L), and thermostats (T), are placed in rooms throughout the apartment building, A 104. To simplify the example 100, not every IoT server device 102 is labeled with a reference number. The building is organized into apartments, 106-112, and each apartment has at least three rooms, a kitchen 114, a living room 116, and a bedroom 118.

The IoT server devices 102 do not have to be broken out to the individual device level, such as a fan, light, or thermostat, but may be organized using an IoT server device 102 that includes all of the devices in a single apartment 106-112, or all the devices in the building, A 104, wherein the devices in each room are listed as resources in the IoT server device 102. Any number of other configurations, such as an IoT server device 102 for just the lights, may be used. The use of smaller levels of granularity may provide some redundancy in case of a failure of an IoT server device 102. The descriptions of short identifier strings and full identifier strings apply in either case. Further, as the URI is unique to the resource, the structuring of the IoT server devices 102 and the individual devices they control will not change the access.

As described herein, a URI is a unique and often descriptive resource identifier for a resource in an IoT server device 102, such as /a/kitchenlight/L, which may refer to a light (L) in a kitchen 114 in A 104. In some examples, /a/kitchenlight may be the complete URI referring to a single kitchen light. This may be shortened, for example, using a lookup table in a resource directory, to /kitlgt, which would be a unique identifier for the same resource in an IoT server device 102. Each URI may also describe the type of resource (RT), such as oic.light, and an interface type and pattern of operation (IF), such as default. The URI may also identify the functional attributes a resource may have. For example, a light resource may have: power {bool}: ON/OFF, and brightness {int 1-10}.

The resources on IoT server devices 102 in the present example 100 may communicate with each other and with gateways 120. The gateways 120 may communicate through a router 122 with devices through a cloud 124. The cloud 124 may be an apartment complex wide area network (WAN), a corporate WAN, or the Internet. Client devices 126 may communicate with the IoT server devices 102 through the cloud 124. The client devices 126 may be smart phones that include apps to control the devices, or may be computers that access the IoT server devices 102 over a web interface, among many other types of devices. In some examples, a control center 128 may be accessed by the client devices 126, and handle communications, control, and security between the client devices 126 and the IoT server devices 102, as well as functioning as a resource directory for registering resources.

For example, lights.aptG.buildingA.com is a URI authority referring to light resources (L) in Apt G 106 in building A 104. Additionally, each light bulb may have an individual URI like /kitchen/1, /kitchen/2, and the like. The attributes of the light bulb may be a state, which may be on/off and a "brightness", which may be set to an integer value (range 1-10). As described in this example, getting the status of bulb 1 in the kitchen can be done using GET oic://lights.aptG.buildingA.com/kitchen/1.

The IoT server device 102 may respond with a payload of the form {"oc": {"rep": [{"href":"lights.aptG.buildingA.com/kitchen/1", "state":"on", "brightness":5}]}}.

As the number of devices increases or as each device supports greater numbers of attributes, the size of the request and response messages also increases which has multiple implications. For example, sending or receiving large messages requires more power and memory which may strain resource constrained devices, for example, devices with limited battery power, limited memory, and the like. Further, if a message crosses the length of the maximum transport unit (MTU) of the transport protocol, e.g. IP, BLE, and the like, the message will be fragmented and reassembled, placing an additional burden on devices for the implementation of additional state machines. According, the overall network utilization from a number of messages sent goes down. Besides OIC, the above challenges are applicable to other resource-based models as well.

In this example 100, a full identifier string may be used by a client device 126 or the control center 128 to discover resources that are of type oic.light in the kitchen 114 of apartment G 106. The full identifier string may be of the form:

GET coap://lights.kitchen.aptG.buildingA.com/oic/core?RT=oiclight.

However, as described herein, the large number of transmissions to different resources in IoT server devices 102 may burden communications, for example, between the gateways 120 and the IoT server devices 102. Accordingly, the efficiency of the communications may be improved by the issuance of a short identifier string to identify the resource for further queries. The short identifier string may be of the form:

GET coap://lt.5RYKHG/oic/core?RT=lgt.

A request from a client device 126 for the attributes of the resource /a/kitchenlight may be made using a full identifier string of the form:

GET coap://lights.kitchen.aptG.buildingA.com/a/kitchenlight?
IF=DEFAULT.

Using the same short identifier string as the previous example, the request would be of the form:

GET coap://lt.5RYKHG/kitlgt?IF=d

To set attributes of a resource, such as turning /a/kitchenlight ON with a brightness of 3, a control command, or command, using a full identifier string may be of the form:

PUT coap://lights.kitchen.aptG.buildingA.com/a/kitchenlight {Payload: power=ON,brightness=3}.

By comparison, the command using the short identifier string may be of the form:

PUT coap://lt.5RYKHG/kitlgt {Payload: power=ON, brightness=3}.

As discuss further herein, shortening 'power' and 'brightness' is also an option for further optimization.

As another example, the resource /a/kitchenlight may be deleted from the IoT server device 102, for example, to trigger a rediscovery, using the full identifier string:

DELETE coap://lights.kitchen.aptG.buildingA.com//a/kitchenlight.

By comparison, the same command may be performed using the short identifier string as:

DELETE coap://lt.5RYKHG/kitlgt.

The short identifier strings may reduce the burden on the infrastructure, for example, utilizing bi-directional radio communications more efficiently. This will allow more communications between devices, which may allow for the use of higher numbers of devices, and improved spectral bandwidth.

Figure 1B:
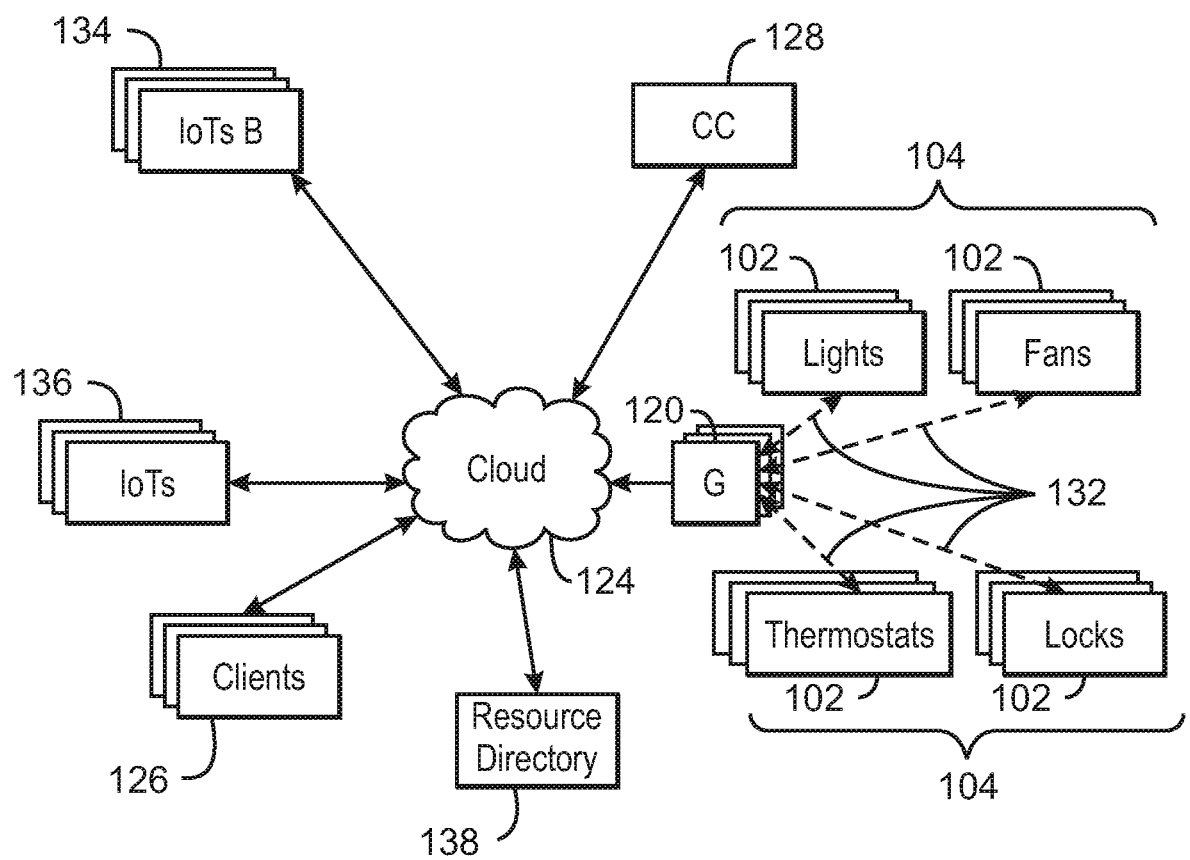
FIG. 1B is another example of communications between cloud computing network, or cloud, in communication with a number of IoT server devices, at least some of which are communicating with client devices.

FIG. 1B is another example of communications between cloud computing network, or cloud 124, in communication with a number of IoT server devices 102, at least some of which are communicating with client devices 126. As described, the cloud 124 may represent the Internet, or may be a wide area network, such as a proprietary network for a company or apartment complex. The IoT server devices 102 may include any number of different types of devices, such as fans, lights, or thermostats, among others, which may be grouped in various combinations, as described herein. It may also be noted that any number of other devices may be used in the network, such as locks, among others.

The IoT server devices 102 may be in communications with gateways 120, for example, over radio links 132. As discussed further with respect to FIGS. 9 and 10, the radio links may include WiFi links in a wireless local area network (WLAN), Bluetooth® links, ZigBee® links, low power wide area network links (LPWAN), wireless wide area network (WWAN) links, and the like. Further, the communications are not limited to radio links 132, as other communications links may be used instead of, or in addition to, the radio links 132. These may include Ethernet links, power line communication (PLC), and the like.

The gateways 120 may be in communication with the cloud 124, for example, over routers 122 (FIG. 1), which may be connected to the Internet over Ethernet links, among others. The gateways 120 themselves may function as IoT server devices hosting resources for access from client devices 126, and other units, such as control centers 128. Further, the gateways 120 may function as routers directing packets into the cloud 124.

The importance of the unique URI is illustrated by this example 130. Other groups of IoT server devices 102 may include IoT groups in another apartment building, e.g., B 134, in the apartment complex, which may have similar names. A resource directory 138 may be used to issue the short identifier strings, for example, for a single complex including building A 104, and other buildings, such as building B 134. Further, IoT groups 136 located in other buildings, cities, or nations may be mistaken if the short identifier string is not sufficiently unique.

Figure 1C:
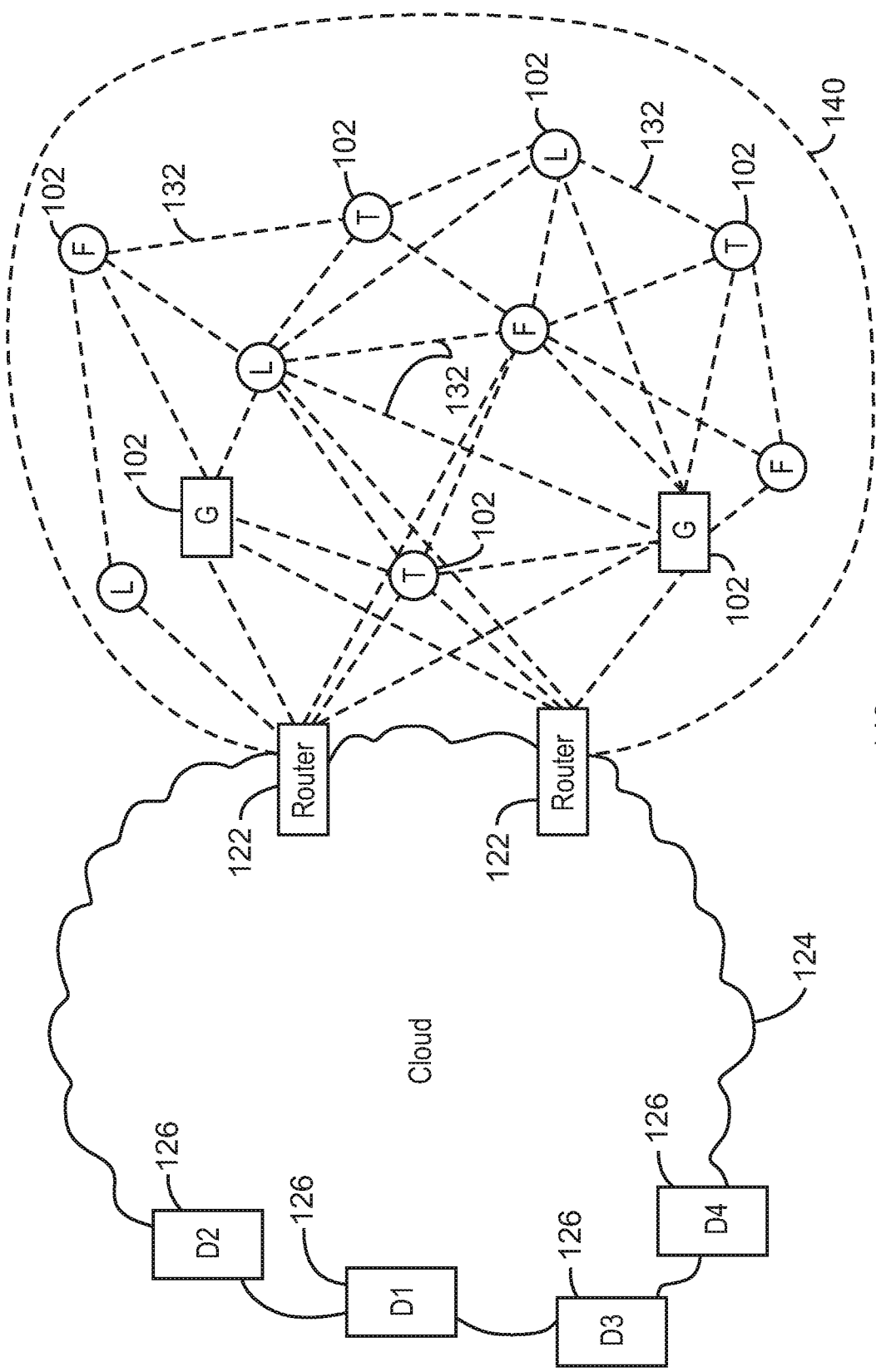

FIG. 1C is another example of a cloud 124, in communication with a mesh network of IoT devices, that may be termed a fog 140, operating at the edge of the cloud. The fog 140 may be considered to be a massively interconnected network wherein a number of IoT server devices 102 are in communications with each other, for example, by radio links 132. To simplify the diagram, not every IoT server device 102 or radio link 132 is labeled with a reference number. Three types of devices are shown in the fog 140 in this example, IoT server devices 102, gateways 120, and routers 122, although any combinations of devices and functionality may be used. The routers 122 may be edge devices that provide communications between the cloud 124 and the fog 140. The gateways 120 may assist IoT server devices 102 in communications, for example, providing higher bandwidth paths to the routers 122. In some example, the gateways 120, the routers 122, or both may function as IoT server devices 102 themselves, providing resources for controlling linked devices, such as fans, lights, or thermostats, among others.

Communications from any IoT server device 102 may be passed along the most convenient path between any of the IoT server devices 102 to reach the routers 122. In these networks, the number of interconnections provide substantial redundancy, allowing communications to be maintained, even with the loss of a number of IoT server devices 102. Further, the use of a mesh network may allow IoT devices 102 that are very low power or located at a distance from infrastructure to be used, as the range to connect to a gateway 120, or another IoT server device 102 may be much less than the range to connect to the routers 122.

The fog 140 of the devices may be presented to clients 126 in the cloud 124 as a single device located at the edge of the cloud 124, e.g., a fog 140 device. In this example, the control communications to specific resources in the fog 140 device may occur without identifying any specific IoT server device 102 within the fog 140. Accordingly, if an IoT server device 102 fails, other IoT server devices 102 may be able to discover and control a resource.

In some examples, the IoT devices 102 may be configured using an imperative programming style, e.g., with each IoT server device 102 having a specific function and communication partners. However, the IoT devices 102 forming the fog 140 device may be configured in a declarative programming style, allowing the IoT devices 102 to reconfigure their operations and communications, such as to determine needed resources in response to conditions, queries, and device failures.

Figure 2:
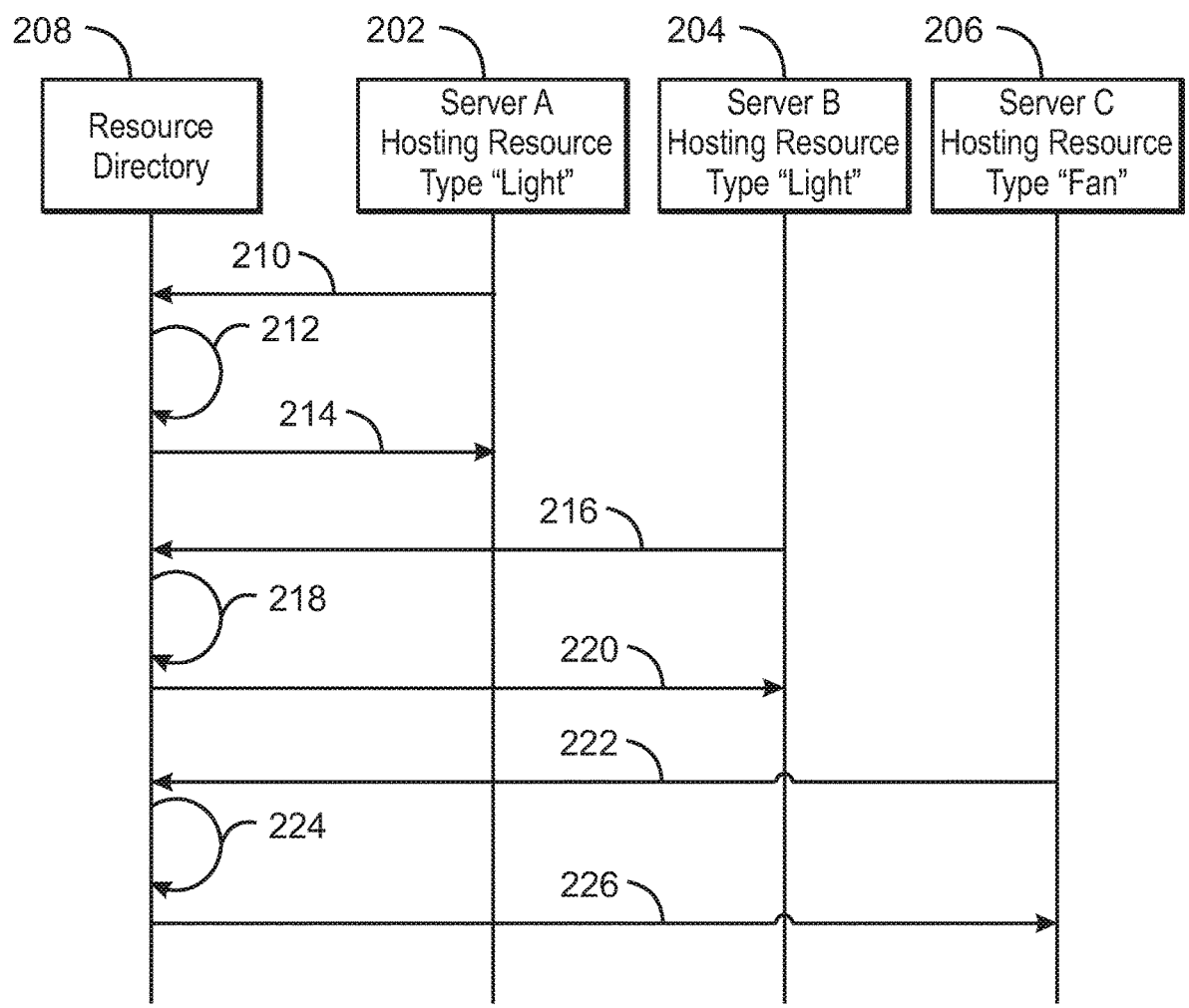
FIG. 2 is a ladder diagram of IoT device servers obtaining short identifier strings from a resource directory.

FIG. 2 is a ladder diagram 200 of IoT server devices obtaining short identifier strings from a resource directory.

In this example, there are three IoT server devices, a server A 202, hosting a resource of type light, a server B 204, also hosting a resource with type light, and server C 206, hosting a resource with type fan. In this example, the address for server A 204 and for server B 204 is "lights.aptG.buildingA.com" and server C's address is "fans.aptG.buildingA.com". The OIC standard has a concept of a resource directory 208 to offload the burden of constrained servers having to respond to discovery requests.

In the example described with respect to FIG. 2, the resource directory provides the short identifier string. If an OIC network does not include a resource directory 208, the short identifier string may be directly provided by an IoT server device. The resource directory 208 may be an entity in the local network which receives packets from the server hosting the resource and provides a short identifier string for the URI, resource properties, and resource attributes as a response. The resource directory 208 may also receive discovery requests from client devices looking for a particular resource.

A server may communicate with the resource directory 208 as the first step after initialization. As an example, server A 202 may send a request 210 to the resource directory 208 with the IP address, resource URIs, resource properties and attributes. The request 210 may include the elements:

"lights.aptG.buildingA.com", "/a/kitchenlight", rt:light, if: oc.mi.def {power, brightness}

The resource directory 208 will read the resource type from the request and make a determination 212 as to whether the resource type exists in stored data. If not, the resource directory 208 creates a short identifier string including the short URI, abbreviated property names, abbreviated names for property ranges, and the like. The resource directory 208 may store the short identifier string along with the full identifier string, e.g., the resource URI, resource properties, and attributes. As described herein, the short identifier may be a shortened form of the full identifier string, for example, including elements pulled from a look-up table based on the elements in the full identifier string. Any number of other techniques may be used to generate the short identifier string. For example, the short identifier string may be generated as a hash code of the resource URI, combined with shorted versions of the properties strings. A random number generator may be used to generate the short identifier string, for example, using the full identifier string as a seed. The resource directory 208 then returns a response 214 including the short identifier string to server A 202. The short identifier string may have the elements:

"lt.5RYKHG", "/kitlgt", rt:lgt, if:d,{pw,lbt}, for example, if a hash code is used to generate the short identifier string from the full identifier string.

Similarly, upon initialization, server B 204 may send a request 216 to the resource directory 208 with the full identifier string, e.g., the IP address, resource URIs, resource properties and attributes. The request may include the elements:

"lights.aptG.buildingA.com", "/a/bedLight", rt: light, if: oc.mi.def, {power, brightness}

The resource directory 208 makes a determination 218 that the resource type, e.g., "lights.aptG.buildingA.com", exists, as it was generated for the first short identifier string sent to server A 202. The resource directory then returns a response 220 with the short identifier string for the resource hosted by server B 204. The short identifier string may include the elements:

"lt.5RYKHG", "/blgt", rt:lgt, if:d,{pw,lbt}.

In this example, server C 206 hosts a resource of type fan. Upon initialization, server C 206 sends a request 222 that includes the full identifier string:

"fans.aptG.buildingA.com", "/a/bedFan", rt: fan, if: oc.mi.def, {power, state}.

The resource directory 208 makes a determination 224 that the resource type, e.g., "fans.aptG.buildingA.com" does not exist in stored memory. It may then create the resource type, for example, using any of the techniques described herein. The resource directory 208 then returns a response 226 to server C 206 with the short identifier string, for example:

"fa.8vRMCX","/bfa", rt:fn, if:d,{pw,st}

Figure 3:
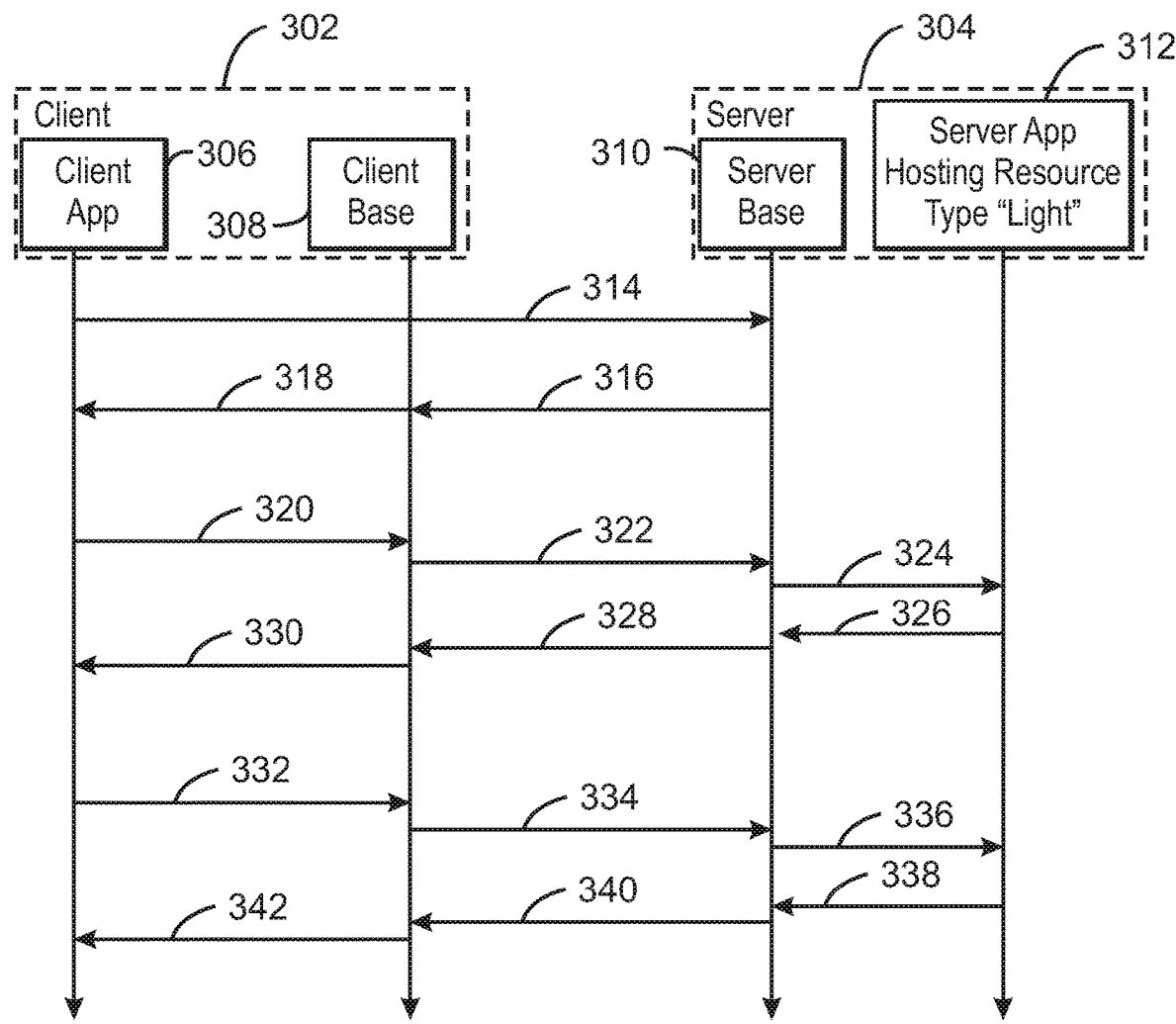
FIG. 3 is a ladder diagram of a client device communicating with an IoT server device using short identifier strings.

FIG. 3 is a ladder diagram 300 showing an example of a client device 302 communicating with an IoT server device 304 using short identifier strings. The client device 302 includes a client app 306 that interfaces with the user and accepts control inputs for a device, such as a light, fan, or other item. In this example, the client app 306 uses full identifier strings for the control and communications. A client base 308 stores information about the device, such as a resource name map of full identifier strings with corresponding short identifier strings. The client base 308 may be part of an IoTivity core stack, e.g., the open source implementation of OIC, which refers to the implementation of OIC upon which a client or a server app is built. Communications from the client app 306, such as IoT resource attribute request, can be intercepted by the client base 308 which replaces full identifier strings with the corresponding short identifier strings.

The IoT server device 304 includes a server base 310 that has already interacted with a server app 312 and is ready to receive shortened version of its host address, resource URI, and resource properties from the client device 302 in the attribute request. As for the client base 308, the server base 310 is the IoTivity core stack. It can be noted that the techniques described herein are not limited to the OIC standard, but may be used to improve communications between IoT devices following other standards. The server base 310 may respond to any communications from the client app 306 or client base 308 with a confirmation response, for example, including an attribute setpoint.

In the example shown in the ladder diagram 300, a discovery request 314 from client is sent to the IoT server device 304, where it is processed by the server base 310. The discovery request 314 may have the format:

GET "coap://224.0.1.187/oc/core?rt=light".

The server base 310 processes the request and sends a response 316 that includes both the full identifier string and the short identifier string:

"lights.aptG.buildingA.com"|"lt.5RYKHG", "/a/kitchenLight"|"/kitlgt", rt: light|rt:lgt, if: oc.mi.def|if:d The client base 308 saves a map of the short identifier string and the corresponding full identifier string. The client base 308 then sends the client app 306 the full identifier string 318:

"lights.aptG.buildingA.com", "/a/kitchenLight", rt: light, if: oc.mi.def

The client app 306 may then use the full identifier string to send commands for controlling the resource.

For example, the client app 306 may send a GET request 320 for determining properties, for example, attribute values, for the light resource using the full identifier string:

GET "lights.aptG.buildingA.com/a/kitchenLight"

The client base 308 can intercept the GET request 320 and check if the client base 308 already has the short identifier string for the resource. If so, the client base 308 will convert the original request using the full identifier string to the short identifier string:

GET "lt.5RYKHG/kitlgt"

The client base 308 can then send the short request 322 over the network to the IoT server device 304.

When the short request 322 reaches the server base 310, the server base 310 will convert the short identifier string to a full identifier string and send the full request 324 on to the server app 312 to invoke the entity handler server code. The server app 312 handles the attribute request and provides a full response 326 to the server base 310:

"/a/kitchenLight", {power=off, brightness=0}

The server base 310 then sends a response 328 to the client device 302 using the short identifier string:

"/kitlgt", {pw=off,lbt=0}

The client base 308 converts the response 328 to using the full identifier string:

"/a/kitchenLight", {power=off, brightness=0}

The client base 308 then sends the full response 330 to the client app 306.

The client app 306 may change properties of the resource, for example, turning on a light using a POST request 332 using the full identifier string:

POST "lights.aptG.buildingA.com/a/kitchenLight" {power=on, brightness=100}

The client base 308 will check if the resource already has a short identifier string associated with the full identifier string. If the short identifier string, the client base 308 will convert the POST request 332 to using the short identifier string:

POST "lt.5RYKHG/kitlgt" {pw=on,lbt=100}

The client base 308 then sends the shortened request 334 out over the network to the IoT server device 304. In this example, the client app 306 is sending the attributes "power=on" and "brightness=100", while the shortened version "pw=on, lbt=100", is sent over the wire.

When the shortened request 334 reaches the server base 310, the server base 310 will convert the short identifier string to a full identifier string and send the full request 336 on to the server app 312 to invoke the entity handler server code. The server app 312 handles the request and confirms success with a full response 338 to the server base 310:

"/a/kitchenLight", {power=on, brightness=100}

The server base 310 then sends a shortened response 340 to the client device 302 using the short identifier string:

"/kitlgt", {pw.on,lbt=100}

The client base 308 can then create a response 342 for the client app 306 that uses the full identifier string:

"/a/kitchenLight", {power=on, brightness=100}

The communications may include the use of the resource directory discussed with respect to FIG. 2. In this example, the client app 306 may initiate the communication by discovering the resources, for example, through the resource directory 208. For example, a home control app may find a light resource by querying (GET) a default OIC resource, /oic/core, with a search filter resource type as rt=light, for example. The request may be unicast and sent to the resource directory 208 (FIG. 2). Since the resource directory 208 has details regarding a full identifier string for the URI, it can process the request from the client app 306. The resource directory 208 may respond to this request with both the full identifier sting and the short identifier string. The client base 308 will store this mapping between the full identifier string and the short identifier string. The client base 308 will then provide the full identifier string to the client app 306. It is to be noted that the response with both strings is only sent once. After that, network communications may proceed using the short identifier string.

For more clarity, only GET and POST operations are shown in FIG. 3. Other REST operations such as PUT and DELETE may be performed in a similar fashion as the GET and POST operations. The operations described in the ladder diagrams of FIGS. 2 and 3 may be summarized as general methods, described with respect to FIGS. 4-6.

Figure 4:
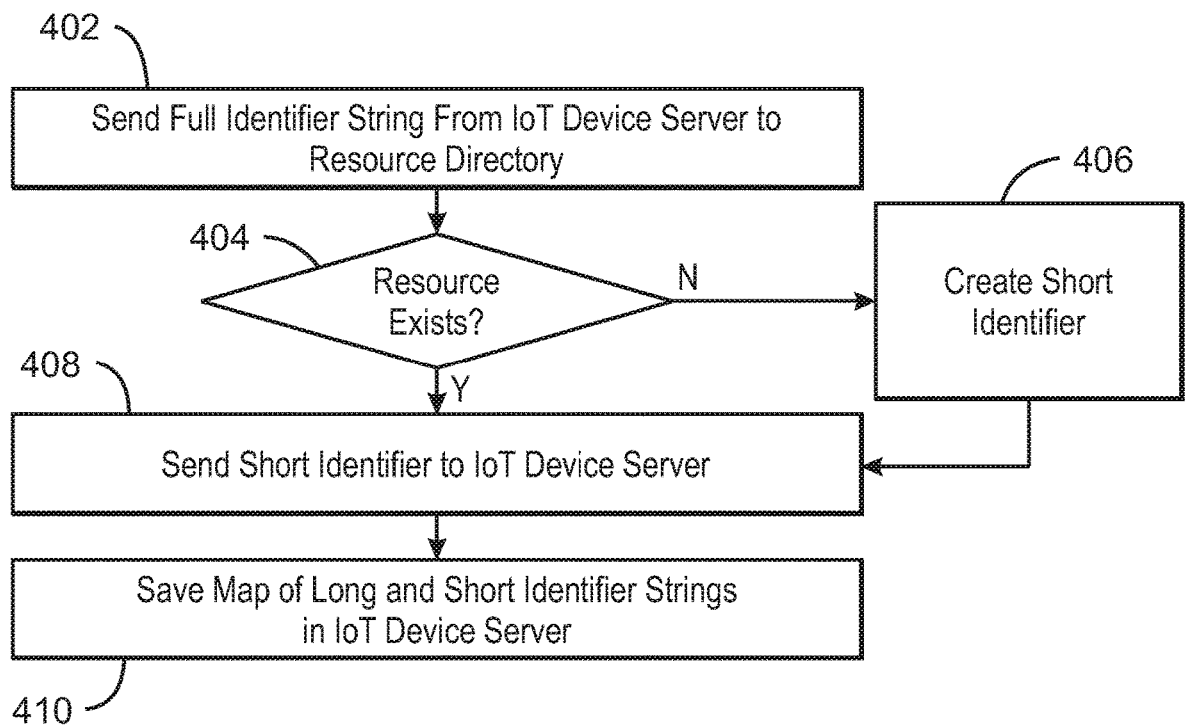
FIG. 4 is a method for an IoT server device to obtain a short identifier string from a resource directory.

FIG. 4 is a method 400 for an IoT server device to obtain a short identifier string from a resource directory. The method 400 begins at block 402 when a full identifier string is sent from an IoT device server to a resource directory, for example, as part of a device registration process. At block 404, the resource directory determines if the resource exists.

If not, process flow proceeds to block 406 to create the short identifier string. Any number of techniques may be used to create the short identifier string. For example, a hash functions, such as a 32 bit cyclic redundancy code (CRC) or a 16 bit CRC, can be used to hash the URI and represent the hashed value as the shortened URI. In this example, the resource directory may have a table where a key, such as the resource URI, and corresponding values, such as the resource properties, attributes, and the like, are stored. Other techniques that may be used include look up tables, random number generators, universal uniform resource identifier (UURI) generators, and the like. In some cases, there might be multiple resource directories in the network and the hashing technique used above may help to make sure that the shortened version of the URI is same across all the shortening generator running in multiple resource directories. The shortened URI may be used with shortened forms of the resource properties, such as lt for light, fa for fan, pw for power, lbt for brightness, and the like, to generate the short identifier string.

Process flow then proceeds to block 408. At block 408, the short identifier string is sent to the IoT server device. At block 410, a map of the associated short and long identifier strings is saved in the IoT server device.

The techniques are not limited to using a resource directory. For example, the IoT server device may create the short identifier string itself. A module for generating short identifier strings may be incorporated into the server implementation of IoTivity base stack. This can provide the ability for the IoT server device to handle the discovery requests and send the full and short identifier strings in response to discovery requests.

Figure 5:
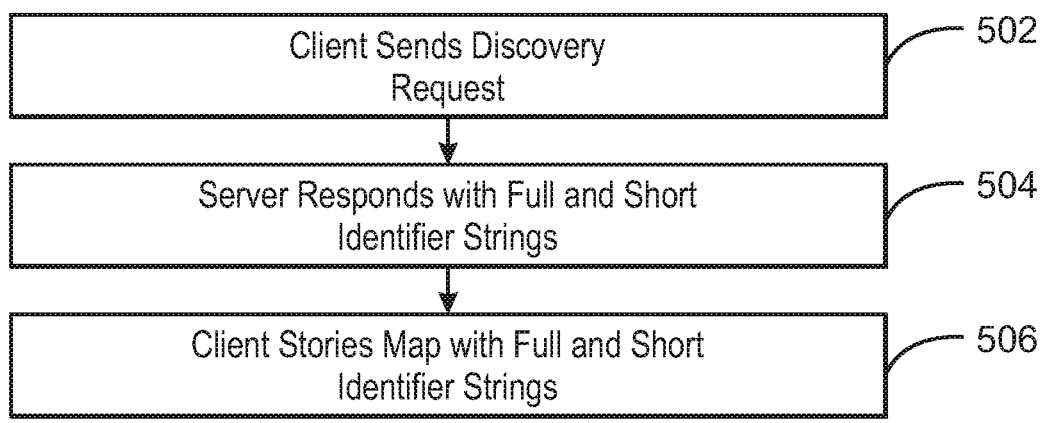
FIG. 5 is a method for an IoT server device to respond to a discovery request using a short identifier string.

FIG. 5 is a method 500 for an IoT server device to respond to a discovery request using a short identifier string. At block 502, a client device sends a discovery request, which is received by the IoT server device. At block 504, the IoT server device responds with both the full identifier string and the short identifier string. At block 506, the client receives the identifier strings from the IoT server device, and saves them in a map.

Since OIC resources can be hosted in a constrained IoT server device, such as an embedded device, it is highly likely that the devices will go into a low powered state. When an IoT server device hosting a resource comes back online from its sleep state, or if a new resource is added on the IoT server device, it can advertise itself using the OIC presence concept. That way, client devices do not have to periodically perform discovery.

With OIC servers changing states from online to offline, the presence mechanism may be used to persist or expire the shortened URI in a resource directory. The resource directory may subscribe for presence notifications on the IoT server device hosting the resources. When there is a change, such as a resource going online or offline, or if the properties of a resource are modified at the resource, the IoT server device may send a notification to the resource directory.

If presence mechanism is not used on by the IoT server device, the resource directory may expire the short identifier string, including the shortened version of the resource URI and the properties and restarts, after a pre-configured time. This may help to ensure that unused URIs are cleaned up periodically. If the IoT server device does not implement presence, it may send the address and resource information to the resource directory.

Figure 6:
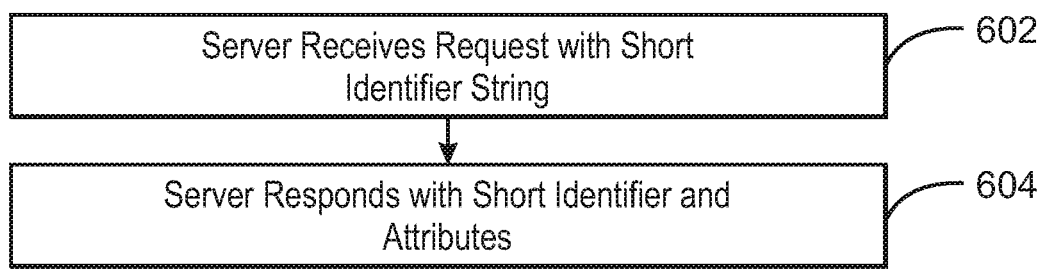
FIG. 6 is a method for an IoT server device to respond to an IoT attribute request made using a short identifier string.

FIG. 6 is a method 600 for an IoT server device to respond to an IoT attribute request made using a short identifier string. The method 600 starts at block 602 when the IoT server device receives a request from a client device using a short identifier string. The IoT server device implements the request, such as determining attributes of a resource or changing attributes of a resource. At block 604 the IoT server device responds using the short identifier string to send the attributes of the resource.

Figure 7:
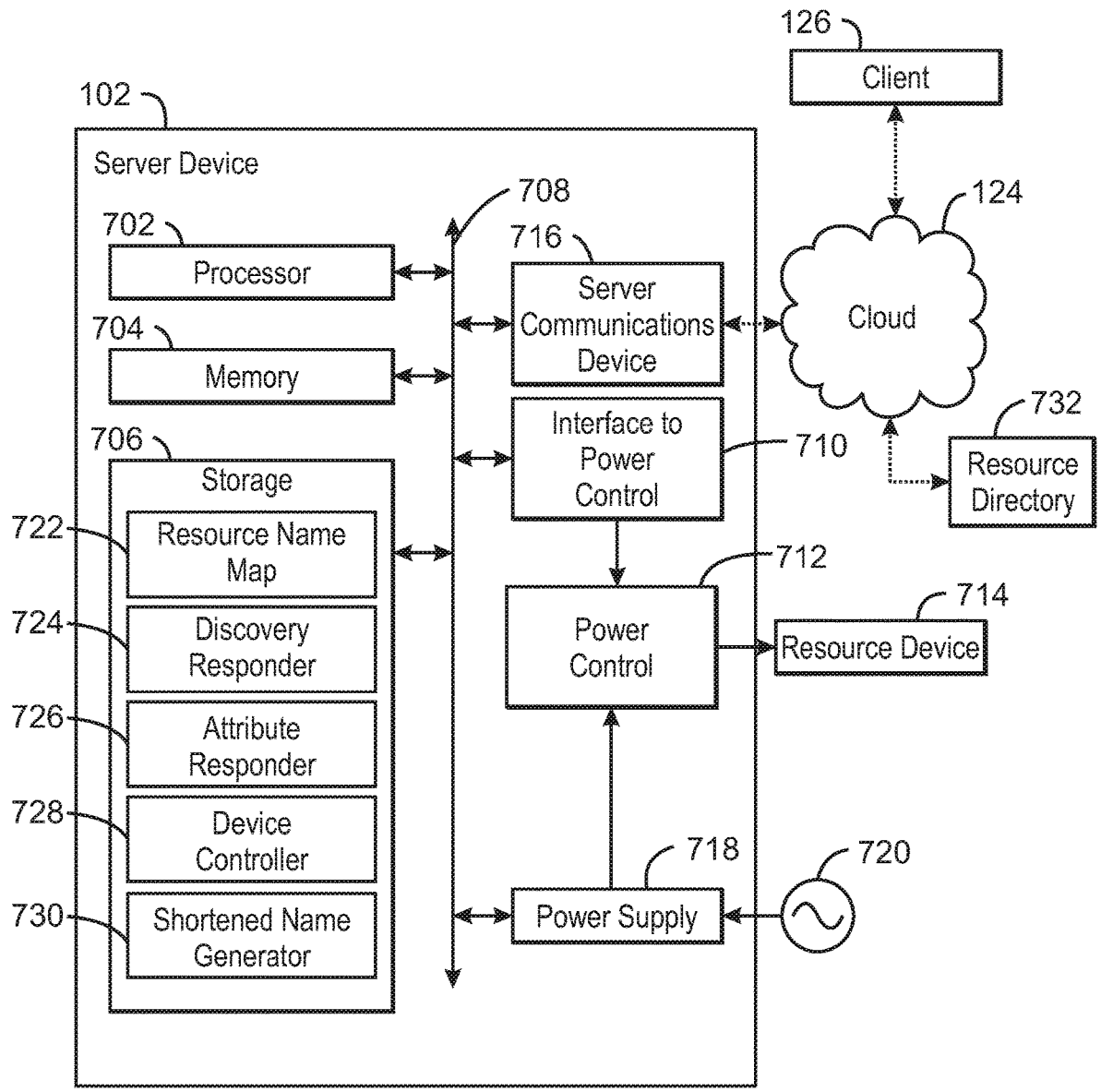
FIG. 7 is a block diagram of an example of an IoT server device.

FIG. 7 is a block diagram of an example of an IoT server device 102. Like numbered items are as described with respect to FIGS. 1A-1C. The example IoT device 700 may include any combinations of the components. The components may be implemented as ICs, portions thereof, discrete electronic devices, or other modules, logic, hardware, software, firmware, or a combination thereof adapted in the IoT server device 102 or as components otherwise incorporated within a chassis of a larger system. The block diagram of FIG. 7 is intended to show a high level view of components of the IoT server device 102. However, some of the components shown may be omitted, additional components may be present, and different arrangement of the components shown may occur in other implementations. The IoT server device 102 may be a server for a single resource, such as a light, a fan, or a thermostat, among many others. Further the IoT server device 102 may host a number of resources, for example, in an individual house, apartment, office, factory, and the like.

As seen in FIG. 7, the IoT server device 102 may include a processor 702, which may be a microprocessor, a multi-core processor, a multithreaded processor, an ultra-low voltage processor, an embedded processor, or other known processing element. The processor 702 may be a part of a system on a chip (SoC) in which the processor 702 and other components are formed into a single integrated circuit, or a single package. As an example, the processor 702 may include an Intel® Architecture Core™ based processor, such as a Quark™, an Atom™, an i3, an i5, an i7, or MCU-class processors, or another such processor available from Intel® Corporation, Santa Clara, Calif. However, other low power processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. These processors may include units such as an A5/A6 or higher processor from Apple® Inc., a Snapdragon™ processor from Qualcomm® Technologies, Inc., or an OMAP™ processor from Texas Instruments, Inc., among others.

The processor 702 may communicate with a system memory 704. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA). Further, the memory may be integrated into an SoC configuration.

To provide for persistent storage of information such as data, applications, operating systems and so forth, a mass storage 706 may also couple to the processor 702. The mass storage may be integrated into an SoC or may be a separate unit. If separate, to enable a thinner and lighter system design the mass storage may be implemented via a solid state disk drive (SSDD). However, the mass storage may be implemented using a micro hard disk drive (HDD) in some IoT server devices 102. Further, any number of new technologies may be used for the mass storage 706 in addition to, or instead of, the technologies described, such resistance change memories, phase change memories, holographic memories, or chemical memories, among others. For example, the IoT server device 102 may incorporate the 3D XPOINT memories from Intel® and Micron®.

The components may communicate over a bus 708. The bus 708 may include any number of technologies, including industry standard architecture (ISA), extended ISA (EISA), peripheral component interconnect (PCI), peripheral component interconnect extended (PCIx), PCI express (PCIe), or any number of other technologies. The bus 708 may be a proprietary bus, for example, used in a SoC based system. Other bus systems may be used, such as the 120 interface, the SPI interface, TIA-485-A, published by the Telecommunications Industry Association/Electronic Industries Alliance (TIA/EIA), Electronic Industries Association (EIA) standard RS-232, and point to point interfaces, among others.

The bus 708 may couple the processor 702 to an interface 710 that is couples to a power control 712 for controlling and powering a resource device 714. The resource device 714 may include lights, fans, thermostats, or door locks, among many others. In some examples, the resource device 714 may include other types of actuators, such as a relay switch in an electrical room or motor control center (MCC), a valve actuator, or an alert system including an audible sound generator, a visual warning device, and the like.

While not shown, various input/output (I/O) devices may be present within, or connected to, the IoT server device 102. For example, a display may be included to show information, such as sensor readings or actuator position. An input device, such as buttons, a touch screen or keypad may be included to accept input.

In some examples, the IoT server device 102 may communicate with a cloud 124 in a variety of manners, including wirelessly. In the embodiment shown in FIG. 7, a server communication device 716 is illustrated. The server communications device 716 may include any combinations of wireless modules, each of which can correspond to a radio configured for a particular wireless communication protocol. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit. The IoT server device 102 is not limited to these types of radio transceivers, but may include any number of other radio communications equipment, such as transceivers compatible with the Bluetooth® standard as defined by the Bluetooth® special interest group. Further, the IoT server device 102 may communicate over a wireless personal area network (WPAN) according to the IEEE 802.15.4 and IEEE 802.15.4g standards, among others. The IoT server device 102 may communicate over a wide area using LoRaWAN (Long Range Wide Area Network) developed by Semtech and the LoRa Alliance, Sigfox, and other ultra-narrow band technologies. These technologies may be used to establish a mesh network between the IoT server device 102 and other devices, as well as the cloud, as discussed with FIG. 10.

The IoT server device 102 is not limited to wireless communications as the server communications device 716 may include a network interface controller, in addition to any wireless modules that may be present, to communicate with the cloud 124 or with other IoT server devices 102 through an Ethernet interface. This may include communicating through a small wired or wireless network shared by number of IoT server devices 102 that communicate with the cloud 124 through a gateway 120 or router 122, as described with respect to FIGS. 1A, 1B, and 10.

The IoT server device 102 may be powered by a power supply 718, for example, connected to an electrical grid 720. The power supply 718 may include any number of other power units, such as a battery, solar cells, or wind generators, among others. The power supply 718 may be used to control power the resource device 714, for example, through the power control 712.

The mass storage 706 may include a number of modules to implement the methods and functions described herein. These modules may include a resource map 722 that stores full identifier strings and associated short identifier strings. A discovery responder 724 may respond to a discovery request from a client device 126 with the full identifier string and the short identifier string. An attribute responder 726 may respond to a request from the client, such as a GET request to obtain attributes, with a short identifier string including the attributes of the resource device 714, for example, power and brightness for a light. If the request is a control change, such as a POST request, the attribute responder 726 may convert the short identifier string to the full identifier string, and activate a device controller 728 to implement the change. Once the change has been made, the attribute responder 726 may respond to the client device 126 with a short identifier string that may indicate success by including the new attributes, or indicate failure by including the current attributes. The mass storage 706 may include a shortened name generator to generate the short identifier string, for example, using the techniques described herein. This may be in addition to, or instead of, a shortened name generator in a resource directory.

The IoT server device 102 is not limited to the configuration shown in FIG. 7, but may include any number of other configurations. For example, the IoT server device 102 may communicate with a resource directory 732 through the cloud 124. In this example, modules may be included in the mass storage 706 to register the IoT server device 102 with the resource directory 732.

Figure 8:
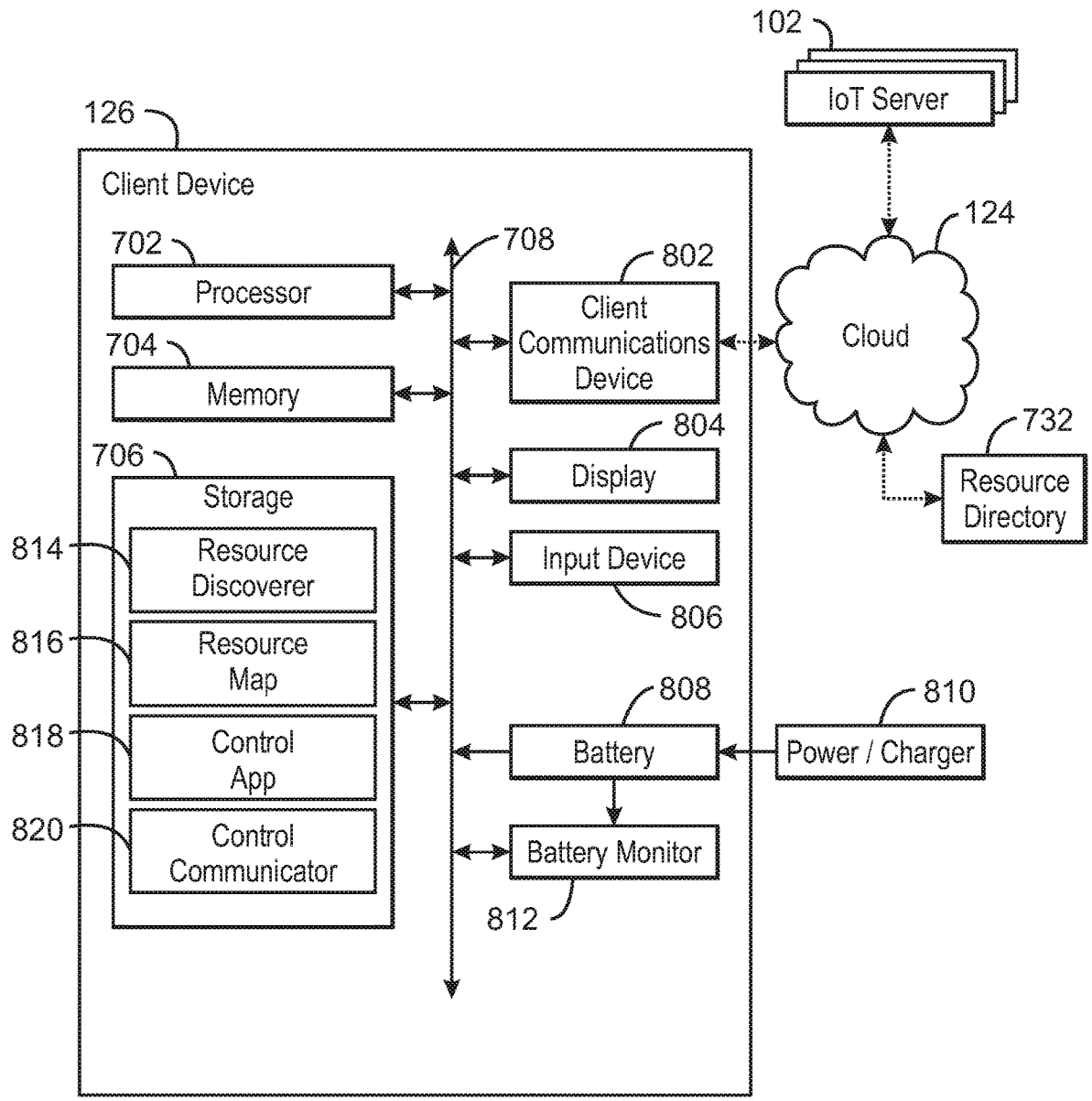
FIG. 8 is a block diagram of an example of a client device.

FIG. 8 is a block diagram of an example of a client device 126. Like numbered items are as described with respect to FIGS. 1A, 1B, 10, and 7. The client device 126 may be a smart phone, a tablet, a laptop computer, a desktop computer, or a local client device, among others. The client device 126 may include a client communications device 802, for example, similar to the server communications device 716 described with respect to FIG. 7. For example, if the client device 126 is a smartphone, the server communications device 716 may include radio transceivers to implement WWAN and WLAN communications with the cloud 124.

Various input/output (I/O) devices may be coupled to the client device 126. For example, a display 804 may be included, which may be a high definition OLED, LCD, or LED panel mounted in a chassis of the client device 126. The display 804 may be part of a display panel that includes a touch screen 806, e.g., adapted externally over the display 804, such that user inputs can be provided to the system to enable desired operations, e.g., with regard to the display of resource attributes, control of resource attributes, and so forth.

In various embodiments, the display 804 can be of different sizes, e.g., 3-3.9", 4-4.5", 11.6", 13.3" or any number of other sizes, and may have a 16:9 aspect ratio. Further, the display 804 may be high definition (HD) resolution (at least 1920×1080p), be compatible with an embedded display port (eDP), or be a low power panel with panel self-refresh, among others.

The touch screen 806 may be multi-touch capable, for example, a capacitive touch screen 806 enabling two or more simultaneous touch entries. In one example, the touch screen 806 and display 804 are accommodated within a damage and scratch-resistant glass and coating (e.g., Gorilla Glass™ or Gorilla Glass 2™) for low friction to reduce "finger burn" and avoid "finger skipping".

The client device 126 may be powered by a battery 808, such as a lithium ion battery, to allow portability. The battery 808 may be charged by a power/charger 810, such as a power block connected to the client device 126 through a universal serial bus (USB) port. A battery monitor 812 may be used to inform a user that the battery 808 needs recharging, increasing the reliability of the control connection to the IoT server device 102.

The mass storage 706 in the client device 126 may include a number of modules to implement the methods and functions described herein. These modules may include a resource discoverer 814 that sends out unicast messages to find resources. The resource discoverer 814 may receive and store full identifier strings and associated short identifier strings in a resource map. A control app 818 may display attribute settings for resources, and allow a user of the client device 126 to make changes to the attributes. The control app 818 may then generate a control string using a full identifier. A control communicator 820 may then take the attribute change request, or IoT resource change request, using the full identifier string, access the corresponding short identifier string from the resource map 816, generate the short identifier string, and send that to the IoT server device 102 through the cloud. The control communicator 820 may also accept response from the IoT server device 102 that use a short identifier string, convert the response to the full identifier string, and provide that to the control app 818 for display.

The client device 126 is not limited to the configuration shown in FIG. 8, but may include any number of other configurations. For example, the client device 126 may communicate with a resource directory 732 through the cloud 124. In this example, modules may be included in the mass storage 706 of the client device 126 to obtain resource information from the resource directory 732 and store the resource information in the resource map 816.

Figure 9:
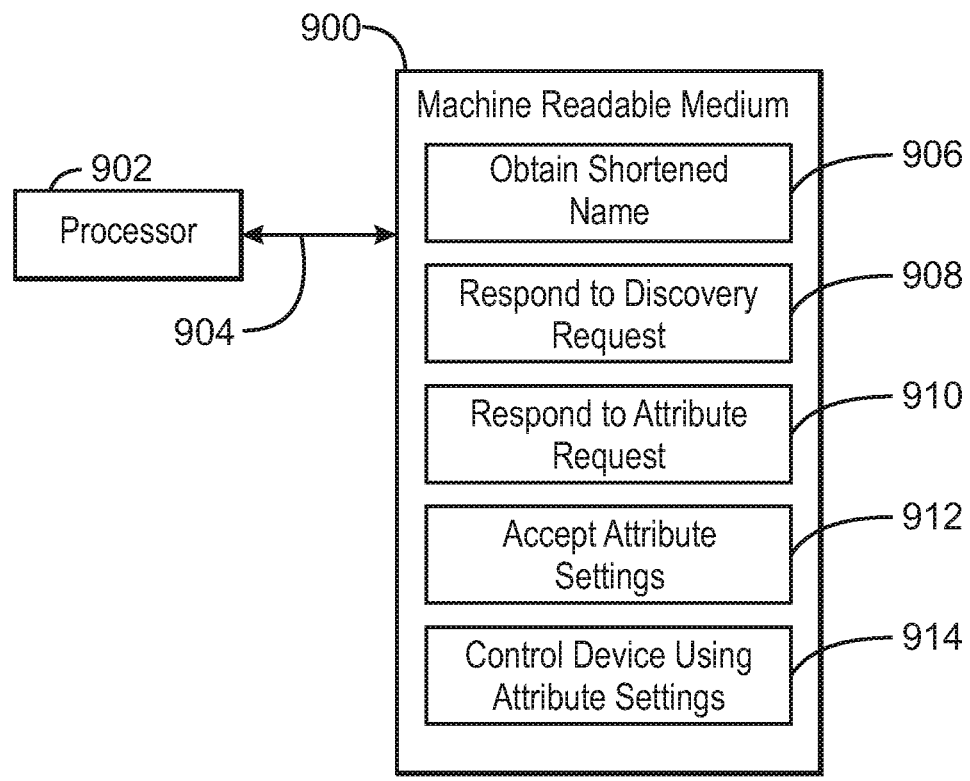
FIG. 9 is a block diagram of a non-transitory, computer readable medium that includes instructions, which when executed, direct one or more processors to perform the functions of an IoT server device.

FIG. 9 is a block diagram of a non-transitory, computer readable medium that includes instructions, which when executed, direct one or more processors to perform the functions of an IoT server device. The non-transitory, computer readable medium 900 may be accessed by the processor 902 over a bus 904 that may include a proprietary bus in an SoC, a SPI bus, or any numbers of other bus technologies, as described with respect to FIG. 7. The non-transitory, computer readable medium 900 may include, for example, any type of read only memory (ROM), any type of solid state drive (SSD), any type of random access memory (RAM), and the like.

The non-transitory, computer readable medium 900 may include instructions 906 to direct the one or more processors 902 to obtain a short identifier string for a resource, for example, from a resource directory or a shortened name generator. Code 908 may be included to direct the one or more processors 902 to respond to a discovery request from a client device, for example, by providing both the full identifier string and the short identifier string for the resource. Code 910 may be included to direct the one or more processors 902 to respond to an attribute request, for example, by sending a short identifier string with the current settings for a resource to a client device. Code 912 may be included to direct the one or more processors 902 to respond to an attribute change request, for example, by converting a short identifier string in the attribute request to a long identifier string, and then having code 914 direct the one or more processors 902 control the resource based on the full identifier string. The code 914 may then direct the one or more processors 902 to respond to the client device with a short identifier string that includes the current attribute settings.

Figure 10:
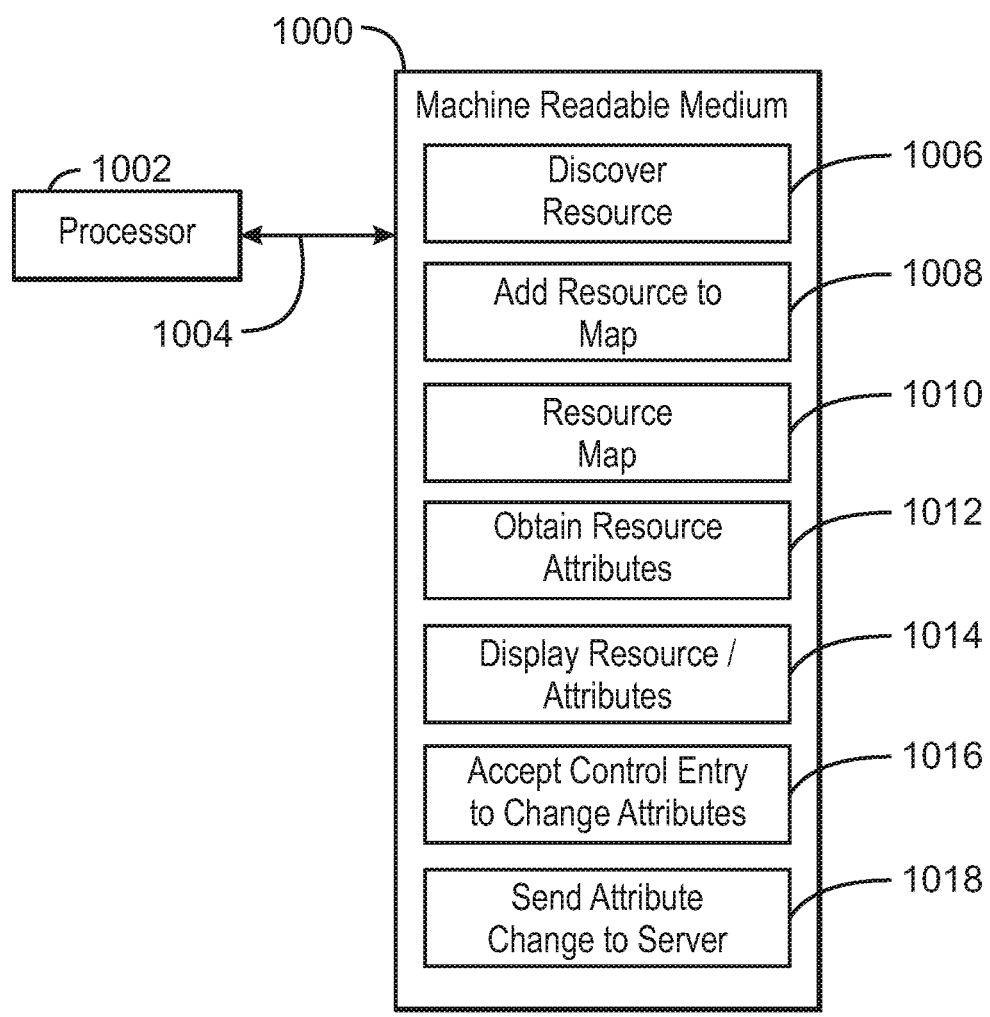
FIG. 10 is a drawing of a cloud computing network, or cloud, in communication with a mesh network of IoT devices, that may be termed a fog, operating at the edge of the cloud.

FIG. 10 is a block diagram of a non-transitory, computer readable medium that includes instructions, which when executed, direct one or more processors to perform the functions of a client device. The non-transitory, computer readable medium 1000 may be accessed by the processor 1002 over a bus 1004 that may include a proprietary bus in an SoC, a SPI bus, or any numbers of other bus technologies, as described with respect to FIG. 7. The non-transitory, computer readable medium 1000 may include, for example, any type of read only memory (ROM), any type of solid state drive (SSD), any type of random access memory (RAM), and the like.

The non-transitory, computer readable medium 1000 may include instructions 1006 to direct the one or more processors 1002 to discover a resource on an IoT server device, for example, by sending a discovery request out in a unicast protocol or communicate with a resource directory. Code 1008 may be included to direct the one or more processors 1002 to save the resource in a resource map 1010, for example, associating the full identifier string for the resource with a short identifier string.

Code 1012 may be included to direct the one or more processors 1002 to obtain resource attributes, for example, by sending a request to the IoT server device using the short identifier string. The code 1012 may then direct the one or more processors 1002 to convert a response from the short identifier string to the full identifier string. Code 1014 may be included to direct the one or more processors 1002 to use the full identifier string to display the resource attributes. Code 1016 may be included to direct the one or more processors 1002 to accept an attribute change from a user and create a full identifier string with the attribute change request. Code 1018 may be included to convert the attribute change request to a short identifier string and send it to an IoT server device.

EXAMPLES

Example 1 includes an apparatus for communicating with an Internet of Things (IoT) device, including an IoT server device. The IoT server device includes a communications device and a resource name map including a full identifier string and a short identifier string. A discovery responder provides the full identifier string and a short identifier string to a client device through the communications device.

Example 2 includes the subject matter of example 1. In this example, the IoT server device includes a shortened name generator to generate the short identifier string.

Example 3 includes the subject matter of either of examples 1 or 2. In this example, the IoT server device includes a shortened name generator to obtain short identifier string from a resource directory via the communications device.

Example 4 includes the subject matter of any one of examples 1 to 3. In this example, the IoT server device includes an attribute responder to respond to attribute requests with short identifier string and an attribute value.

Example 5 includes the subject matter of any one of examples 1 to 4. In this example, the IoT server device includes a device controller to change an attribute for a physical device, a logical entity, or both.

Example 6 includes the subject matter of any one of examples 1 to 5. In this example, an attribute includes an on state, an off state, a brightness, or a temperature, or any combinations thereof.

Example 7 includes the subject matter of any one of examples 1 to 6. In this example, the apparatus includes a client device including a client communications device, and a resource discoverer to receive, from the IoT server device via the client communications device, the full identifier string and the short identifier string for an IoT resource. The resource discoverer is to map the short identifier string to the full identifier string in a resource map.

Example 8 includes the subject matter of any one of examples 1 to 7. In this example, a client device includes a control app to issue a control command to the IoT resource based on the full identifier string.

Example 9 includes the subject matter of any one of examples 1 to 8. In this example, the client device includes a control communicator to access the resource map to associate the full identifier string from the control app with the short identifier string. The control communicator is to issue the control command to the IoT server device based on the short identifier string via the client communications device.

Example 10 includes the subject matter of any one of examples 1 to 9. In this example, the client device includes a display or an input device, or both.

Example 11 includes a method for communicating between an Internet of Things (IoT) server device and a client device. The method includes receiving a discovery request from the client device in the IoT server device, sending a full identifier string for an IoT resource to the client device, and sending a short identifier string for the IoT resource to the client device.

Example 12 includes the subject matter of example 11. In this example, the method includes storing the full identifier string and the short identifier string in the client device.

Example 13 includes the subject matter of either of examples 11 or 12. In this example, the method includes converting an IoT resource attribute request based on the full identifier string from a control app to the short identifier string and sending the IoT resource attribute request from the client device to the IoT server device. An IoT attribute response is received from the IoT server device based on the short identifier string, and the IoT attribute response is converted to the full identifier string for the control app.

Example 14 includes the subject matter of any one of examples 11 to 13. In this example, the method includes converting an IoT resource change request based on the full identifier string from a control app to the short identifier string and sent from the client device to the IoT server device. A confirmation response is received from the IoT server device based on the short identifier string, and converted to the full identifier string for the control app.

Example 15 includes the subject matter of any one of examples 11 to 14. In this example, the method includes sending the full identifier string from the IoT server device to a resource directory, and receiving the short identifier string from the resource directory in the IoT server device.

Example 16 includes the subject matter of any one of examples 11 to 15. In this example, the method includes generating the short identifier string for the IoT resource.

Example 17 includes the subject matter of any one of examples 11 to 16. In this example, the method includes generating a hash code of the full identifier string to generate the short identifier string.

Example 18 includes a non-transitory, computer readable medium, including instructions to direct one or more processors to respond to a discovery request with a full identifier string for an IoT (internet-of-things) resource and a short identifier string for the IoT resource.

Example 19 includes the subject matter of example 18. In this example, the non-transitory, computer readable medium includes instructions, which when executed, direct the one or more processors to respond to an IoT attribute request including the short identifier string for the IoT resource.

Example 20 includes the subject matter of either of examples 18 or 19. In this example, the non-transitory, computer readable medium includes instructions, which when executed, direct the one or more processors to respond to an IoT attribute change request including the short identifier string for the IoT resource.

Example 21 includes the subject matter of any one of examples 18 to 20. In this example, the non-transitory, computer readable medium includes instructions, which when executed, direct the one or more processors to make an IoT attribute change in an IoT device based on an IoT attribute change request including the short identifier string for the IoT resource.

Example 22 includes the subject matter of any one of examples 18 to 21. In this example, the non-transitory, computer readable medium includes instructions, which when executed, direct the one or more processors to obtain the short identifier string for the full identifier string from a resource directory.

Example 23 includes a non-transitory, computer readable medium, including instructions to direct one or more processors to discover an IoT (internet-of-things) resource, receive a full identifier string for the IoT resource from an IoT device server, receive a short identifier string for the IoT resource from the IoT device server, and add the full identifier string and the short identifier string to a resource map.

Example 24 includes the subject matter of example 23. In this example, the non-transitory, computer readable medium includes instructions, which when executed, direct the one or more processors to send an IoT attribute request including the short identifier string for the IoT resource to the IoT device server.

Example 25 includes the subject matter of either of examples 23 or 24. In this example, the non-transitory, computer readable medium includes instructions, which when executed, direct the one or more processors to send an IoT attribute change request including the short identifier string for the IoT resource to the IoT device server.

Example 26 includes a non-transitory, computer readable medium, including instructions to direct one or more processors to perform the method of any one of examples 11 to 17.

Example 27 includes an apparatus including means to perform a method as claimed in any one of examples 11 to 17.

Example 28 includes an apparatus for communicating with an Internet of Things (IoT) device, including a communications device and a resource name map including a full identifier string and a short identifier string. The apparatus includes a means for providing the full identifier string and the short identifier string to a client device.

Example 29 includes the subject matter of example 28. In this example, the apparatus includes a means for generating the short identifier string.

Example 30 includes the subject matter of either of examples 28 or 29. In this example, the apparatus includes a means for obtaining the short identifier string.

Example 31 includes the subject matter of any one of examples 28 to 30. In this example, the apparatus includes a means for responding to attribute requests with the short identifier string and an attribute value.

Example 32 includes the subject matter of any one of examples 28 to 31. In this example, the apparatus includes a means for changing an attribute.

Example 33 includes the subject matter of any one of examples 28 to 32. In this example, the apparatus includes a means for discovering resources on an IoT server device.

Example 34 includes the subject matter of any one of examples 28 to 33. In this example, the apparatus includes a means for issuing a control command.

Example 35 includes an IoT server device. The IoT server device includes a communications device, a resource name map including a full identifier string and a short identifier string, and a discovery responder to provide the full identifier string and a short identifier string to a client device through the communications device.

Example 36 includes the subject matter of example 35. In this example, the IoT server device includes a shortened name generator to generate the short identifier string.

Example 37 includes the subject matter of either of examples 35 or 36. In this example, the IoT server device includes a shortened name generator to obtain short identifier string from a resource directory via the communications device.

Example 38 includes the subject matter of any one of examples 35 to 37. In this example, the IoT server device includes an attribute responder to respond to attribute requests with short identifier string and an attribute value.

Example 39 includes the subject matter of any one of examples 35 to 38. In this example, the IoT server device includes a device controller to change an attribute for a physical device, a logical entity, or both.

Example 40 includes the subject matter of any one of examples 35 to 39. In this example, an attribute includes an on state, an off state, a brightness, or a temperature, or any combinations thereof.

Example 41 includes a client device. The client device includes a client communications device, and a resource discoverer to receive, from the IoT server device via the client communications device, the full identifier string and the short identifier string for an IoT resource and to map the short identifier string to the full identifier string in a resource map.

Example 42 includes the subject matter of example 41. In this example, the client device includes a control app to issue a control command to the IoT resource based on the full identifier string.

Example 43 includes the subject matter of any one of examples 41 to 42. In this example, the client device includes a control communicator to access the resource map to associate the full identifier string from the control app with the short identifier string, and issue the control command to the IoT server device based on the short identifier string via the client communications device.

Example 44 includes the subject matter of any one of examples 41 to 43. In this example, the client device includes a display or an input device, or both.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for communicating with an internet-of-things (IoT) device, comprising an IoT server device comprising:
   a communications device;
   a resource name map comprising a full identifier string and a short identifier string for an IoT resource;
   one or more processors; and
   storage to store code to direct the one or more processors to:
      access the resource name map to identify the short identifier string uniquely assigned to the full identifier string;
      communicate the full identifier string between a server base of the IoT server device and an app of the IoT server device;
      provide the short identifier string to a client device through the communications device, wherein providing of the short identifier string maintains shortening in a manner that is transparent from an application layer of the IoT server device; and
      send, in response to a change in the IoT resource, a notification to a resource directory that indicates whether to persist the short identifier string, the short identifier string configured to automatically expire after a pre-configured time if the notification is not received.

2. The apparatus of claim 1, wherein the IoT server device comprises a shortened name generator to generate the short identifier string.

3. The apparatus of claim 1, wherein the IoT server device comprises a shortened name generator to obtain the short identifier string from the resource directory via the communications device.

4. The apparatus of claim 1, wherein the IoT server device comprises an attribute responder to respond to attribute requests with the short identifier string and an attribute value.

5. The apparatus of claim 1, wherein the IoT server device comprises a device controller to change an attribute for a physical device, a logical entity, or both.

6. The apparatus of claim 5, wherein the attribute includes an on state, an off state, a brightness, or a temperature, or any combinations thereof.

7. The apparatus of claim 1, comprising the client device comprising:
 a client communications device; and
 a resource discoverer to receive, from the IoT server device via the client communications device in a response to a discovery request from the client device, the full identifier string and the short identifier string and to map the short identifier string to the full identifier string in a resource map.

8. The apparatus of claim 7, wherein the client device comprises a control app to issue a control command to the IoT resource based on the full identifier string.

9. The apparatus of claim 8, wherein the client device comprises a control communicator to access the resource map to associate the full identifier string from the control app with the short identifier string, and issue the control command to the IoT server device based on the short identifier string via the client communications device.

10. The apparatus of claim 7, wherein the client device comprises a display or an input device, or both.

11. The apparatus of claim 1, wherein the short identifier string is a hash code of a shortened resource uniform resource identifier (URI) of the full identifier string combined with shorted versions of properties strings of the full identifier string.

12. The apparatus of claim 1, wherein the short identifier string is a random number generated using the full identifier string as a seed.

13. The apparatus of claim 1, wherein the code directs the one or more processors to, in response to reception of the short identifier string in a short attribute request from the client device, convert the short identifier string from the client device to the full identifier string and send a full attribute request that contains the full identifier string to the app to invoke an entity handler server code to handle the full attribute request.

14. The apparatus of claim 1, wherein the code directs the one or more processors to:
 receive, from the resource directory, a subscription for presence notifications, and
 in response to reception of the subscription, transmit, to the resource directory, a notification in response to a resource change, the resource change is selected from a set of resource changes that include a modification in properties of a resource at the resource and a change in an online state of the resource.

15. The apparatus of claim 14, wherein the notification indicates to the resource directory to persist the short identifier string, the short identifier string includes a shortened version of a resource uniform resource identifier (URI) and properties of the resource, and the short identifier string is configured to automatically expire after a pre-configured time if the notification is not received.

16. The apparatus of claim 1, wherein the code further directs the one or more processors to receive a subscription for presence notifications and send the notification response to the resource change after reception of the subscription for presence notifications.

17. A method for communicating between an internet-of-things (IoT) server device and a client device, comprising:
 receiving a discovery request, from the client device, in the IoT server device;
 sending a full identifier string for an IoT resource to the client device in response to the discovery request;
 sending a short identifier string for the IoT resource to the client device in response to the discovery request, wherein sending of the short identifier string maintains shortening in a manner that is transparent from an application layer of the IoT server device; and
 sending, in response to a change in the IoT resource, a notification to a resource directory that indicates whether to persist the short identifier string, the short identifier string configured to automatically expire after a pre-configured time if the notification is not received.

18. The method of claim 17, comprising storing the full identifier string and the short identifier string in the client device.

19. The method of claim 17, comprising:
 converting an IoT resource attribute request based on the full identifier string from a control app to the short identifier string;
 sending the IoT resource attribute request from the client device to the IoT server device;
 receiving an IoT attribute response from the IoT server device based on the short identifier string; and
 converting the IoT attribute response to the full identifier string for the control app.

20. method of claim 17, comprising:
 converting an IoT resource change request based on the full identifier string from a control app to the short identifier string;
 sending the IoT resource change request from the client device to the IoT server device;
 receiving a confirmation response from the IoT server device based on the short identifier string; and
 converting the confirmation response to the full identifier string for the control app.

21. The method of claim 17, comprising:
 sending the full identifier string from the IoT server device to a resource directory; and
 receiving the short identifier string from the resource directory in the IoT server device.

22. The method of claim 17, comprising generating the short identifier string for the IoT resource.

23. The method of claim 17, comprising generating a hash code of the full identifier string to generate the short identifier string.

24. The method of claim 17, further comprising:
 receiving, from the resource directory, a subscription for presence notifications; and
 in response to reception of the subscription, transmitting, to the resource directory, a notification in response to a resource change, the resource change selected from a set of resource changes that include a modification in properties of a resource at the resource and a change in an online state of the resource,
 wherein the notification indicates to the resource directory to persist the short identifier string, the short identifier string includes a shortened version of a resource uniform resource identifier (URI) and properties of the resource, and the short identifier string is configured to automatically expire after a pre-configured time if the notification is not received.

25. A non-transitory, computer readable medium, comprising instructions, which when executed, direct one or more processors of an internet-of-things (IoT) server device to respond to a discovery request from a client device with a full identifier string for an IoT resource and a short identifier string for the IoT resource, wherein the short identifier string maintains shortening in a manner that is transparent from an application layer of the IoT server device, and wherein the short identifier string is a random number generated using the full identifier string as a seed.

26. The non-transitory, computer readable medium of claim 25, comprising instructions, which when executed, direct the one or more processors to respond to an IoT attribute request comprising the short identifier string for the IoT resource.

27. The non-transitory, computer readable medium of claim 25, comprising instructions, which when executed, direct the one or more processors to respond to an IoT attribute change request comprising the short identifier string for the IoT resource.

28. The non-transitory, computer readable medium of claim 25, comprising instructions, which when executed, direct the one or more processors to make an IoT attribute change in an IoT device based on an IoT attribute change request comprising the short identifier string for the IoT resource.

29. The non-transitory, computer readable medium of claim 25, comprising instructions, which when executed, direct the one or more processors to obtain the short identifier string for the full identifier string from a resource directory.

30. A non-transitory, computer readable medium, comprising instructions, which when executed, direct one or more processors to:
discover an internet-of-things (IoT) resource during initialization using a discovery request;
receive a full identifier string for the IoT resource from an IoT server device in response to the discovery request;
receive a short identifier string for the IoT resource from the IoT server device in response to the discovery request, wherein the short identifier string maintains shortening in a manner that is transparent from an application layer of the IoT server device, wherein the short identifier string is a random number generated using the full identifier string as a seed;
add the full identifier string and the short identifier string to a resource map; and
after initialization, use the short identifier string instead of the full identifier string during interactions with the IoT server device that involve the IoT resource.

31. The non-transitory, computer readable medium of claim 30, comprising instructions, which when executed, direct the one or more processors to send an IoT attribute request comprising the short identifier string for the IoT resource to the IoT server device.

32. The non-transitory, computer readable medium of claim 30, comprising instructions, which when executed, direct the one or more processors to send an IoT attribute change request comprising the short identifier string for the IoT resource to the IoT server device.

33. The non-transitory, computer readable medium of claim 30, comprising instructions, which when executed, further direct one or more processors to:
receive, from a resource directory, a subscription for presence notifications; and
in response to reception of the subscription, transmit, to the resource directory, a notification in response to a resource change, the resource change selected from a set of resource changes that include a modification in properties of a resource at the resource and a change in an online state of the resource, wherein the notification indicates to the resource directory to persist the short identifier string, the short identifier string including a shortened version of a resource uniform resource identifier (URI) and properties of the resource, and the short identifier string is configured to automatically expire after a pre-configured time if the notification is not received.

* * * * *